Oct. 17, 1950          A. REFSDAL          2,526,415

DEVICE FOR SECURING TELESCOPING TUBES TO EACH OTHER

Filed July 19, 1947

Inventor:
ANFINN REFSDAL
BY Boettcher & Dunn
Attorneys.

Patented Oct. 17, 1950

2,526,415

UNITED STATES PATENT OFFICE 2,526,415

DEVICE FOR SECURING TELESCOPING TUBES TO EACH OTHER

Anfinn Refsdal, Lilleaker, near Oslo, Norway

Application July 19, 1947, Serial No. 762,042
In Norway October 29, 1946

2 Claims. (Cl. 287—58)

The present invention relates to a device for securing telescoping tubes to each other in an easy and cheap way. The invention will chiefly be employed for ski rods of adjustable length, but may also be used in other fields.

The simplest arrangement will be to use two slightly oval instead of circular tubes. If two such tubes are turned a certain angle relative to each other, both tubes will attempt to force the other one to adopt a more circular shape and thereby they will be wedged firmly to each other. However, in this manner a particularly strong fixation is scarcely obtained, so that for skid rods the arrangement shown in the drawings in connection with circular tubes will be preferable.

Figure 3:
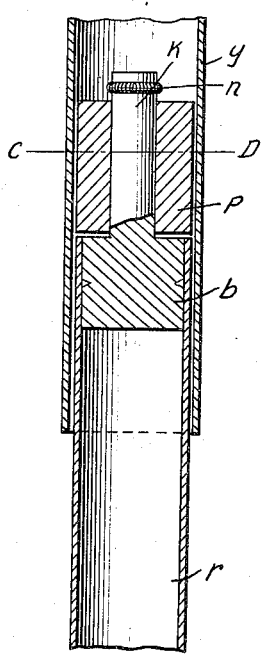
Figure 3 is a vertical sectional view, similar to Figure 1, of a modified form of device.
Figure 5:
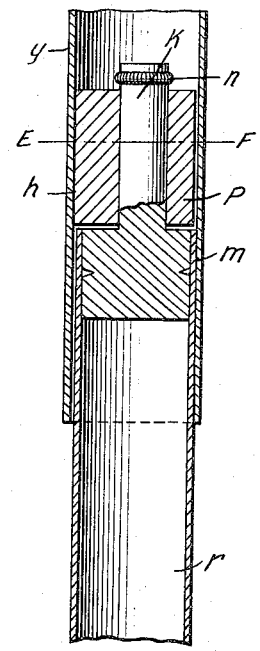
Figure 2:
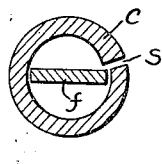
Figure 2 is a sectional view taken along the line A—B of Figure 1, with the outer tube removed.
Figure 4:
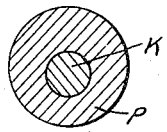
Figure 4 is a sectional view, similar to Figure 2, taken along the line C—D of Figure 3.
Figure 6:
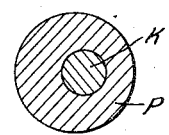

Figure 5 is a vertical sectional view of the device of Figures 3 and 4, but with the outer tube rotated approximately 180°, and Figure 6 is a sectional view, similar to Figures 2 and 4, taken along line E—F of Figure 5.

Figure 1:
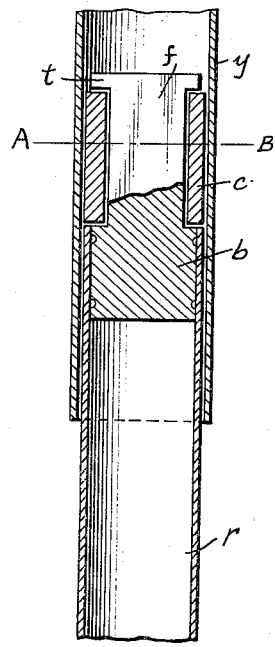
Figure 1 is a fragmentary vertical sectional view of a pair of telescoped tubes embodying the principles of the present invention.

Fig. 1 shows the inner tube $r$ inserted into the outer tube $y$. Firmly secured to the top of the inner tube is a cylindrical piece $b$, which has a flat extension $f$ in a slightly eccentric position. This extension is surrounded by a cylindrical ring $c$, which is held in position by projecting edges $t$ of the extension $f$.

Fig. 2 is a sectional view taken along the line A—B with the outer tube removed. The ring $c$ is split axially at $s$. The thickness of the ring is different on each side of the slot, varying gradually along the periphery. The ring bears against the inside wall of the outer tube with resilient pressure. Yet this pressure is not so great as to prevent easy axial displacement of the tubes relative to each other.

When the flat extension $f$ is positioned as shown in Fig. 2, it exerts no pressure on the ring $c$, and the two tubes may be axially displaced with respect to each other. If, however, the outer tube is turned counter-clockwise as viewed from above, the ring $c$ will be entrained in this movement and the extension $f$ will exert a constantly increasing pressure on the ring $c$, which is thereby forced firmly against the outer tube and hence locks the two tubes together.

Figs. 3-6 illustrate a still simpler arrangement. The cylindrical piece $b$, which is rigidly secured to the inner tube $r$, has a cylindrical extension $k$ in a slightly eccentric position. The extension $k$ is surrounded by a cylindrical sleeve $p$ which has a snug fit in the outer tube $y$. The hole in this sleeve fits snugly on the extension $k$, but is yet easily rotatable around it and has a corresponding eccentric position. Thereby the sleeve $p$ can be positioned so that it flushes with the inner tube and consequently the outer tube can be passed onto the piece $b$ and the inner tube. This is shown in Fig. 3 and in Fig. 4, which is a cross section along the line C—D, $n$ is a locking spring which keeps the sleeve in position.

If the outer tube is turned relative to the inner one, the sleeve $p$ will be entrained in this movement and adopt a position as shown in Fig. 5 and in Fig. 6, which is a cross section along the line E—F. In this position the sleeve $p$ is slightly displaced laterally relative to the inner tube because of the eccentric location of the hole, and thereby a heavy pressure is exerted on the outer tube by the sleeve $p$ at $h$ and by the inner tube at $m$, whereby the two tubes are locked together.

In Figs. 5 and 6 the outer tube is turned almost 180°. In practice it will be arranged so that the two tubes are locked by a rotation of about 90°. Minor inaccuracies in the diameter of the outer tube will in that case be of no importance.

I claim:

1. A device of the class described comprising, an outer tubular member having a cylindrical interior surface, an inner member having a cylindrical exterior surface fitting into said cylindrical surface of the outer member so as to permit relative rotational and axial movement of said members with respect to each other, an extension on the end of said inner member fitting into said outer member, an annular member mounted on said extension and having a cylindrical exterior surface fitting into and engaging said cylindrical interior surface of said outer member and having an interior camming surface eccentric with respect to said cylindrical exterior surface of said annular member, said camming surface of said annular member on relative rotation of said inner and outer members engaging said extension for effecting clamping of said annular member between said extension and said outer member, and stop means on said extension for retaining said annular member thereon.

2. The device of claim 1 characterized by said camming surface of said annular member being cylindrical, and by said extension having an exterior cylindrical surface for engagement with the camming surface of said annular member and of the same degree of eccentricity with respect to the outer cylindrical surface of said inner member as said camming surface has with respect to said outer cylindrical surface of said annular member.

ANFINN REFSDAL.

REFERENCES CITED

The following references are of record in the file of this patent:

UNITED STATES PATENTS

| Number | Name | Date |
|---|---|---|
| 966,666 | Dimler | Aug. 9, 1910 |